May 3, 1966     O. V. JORGENS     3,248,804
TEACHING AID
Filed July 16, 1962
FIG.____1
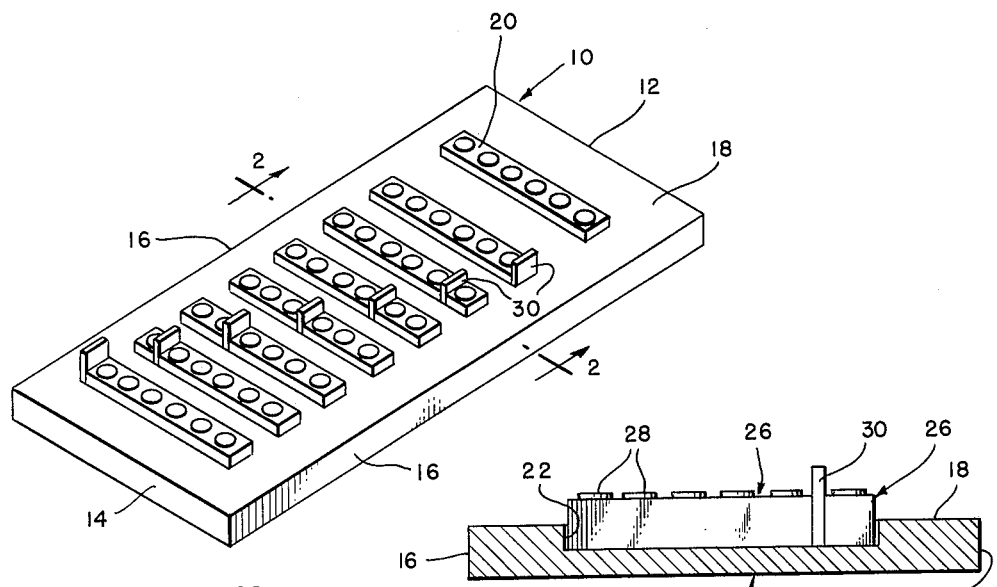
FIG.____2
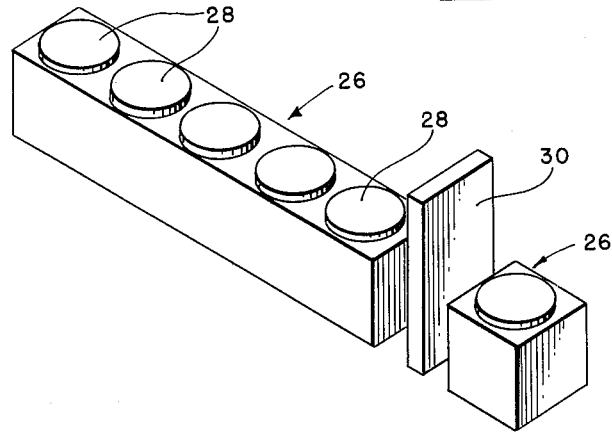
FIG.____3
OLIVE JORGENS
*INVENTOR.*
BY *Jorol Smith*

United States Patent Office 3,248,804
Patented May 3, 1966

3,248,804
TEACHING AID
Olive Virginia Jorgens, 3543 Dawson St., Seattle, Wash.
Filed July 16, 1962, Ser. No. 209,859
1 Claim. (Cl. 35—31)

This invention relates to a new and useful concept in a teaching or educational device for children and more particularly to an instruction aid which will assist teachers and instructors of early elementary grades in teaching the various combinations of small mathematical units required to equal a larger mathematical unit.

A problem with which first grade teachers have long been concerned is in conveying to children the significance of the various combinations of lesser values into which a larger single value may be divided. Many devices have been designed in an attempted to convey to children the significance of lesser units as they relate to larger units. The usual approach has been to use a standard compared to any combination of smaller units put together to equal the larger.

The present invention is designed to place before the child, without the visual aid and actual use of written numbers, an assembly of movable blocks with indicia thereon representing numerical values. The child works exclusively with movable blocks. The board is conceived to present a complete picture of the various combinations, including zero, which will equal a particular total number standard associated with a particular board. In brief, the invention contemplates a separate standard board for each numerical value from two through ten. Also a standard block is fixed to the tops of each standard board with indicia thereon representing its value. Below the standard are rows of recesses which receive removable blocks in groups of the same total value as the standard block. A divider or separator, representing zero value, is inserted in each group between the lesser value blocks and at one end of the equal value blocks to clearly mark the different combinations. There are as many recesses as combinations of at least two numerical value blocks which equal the standard value. By manipulating the blocks and the separators a child is able to clearly see the relationship of smaller values to given larger values.

Accordingly it is an object of this invention to provide an educational device which is simple in design, rugged in construction and yet inexpensive to produce.

Another object of this invention is to furnish an educational device which aids and helps teachers to instruct children in the relationships of smaller mathematical values vis-a-vis larger values.

Still another object of this invention is to supply an educational device which presents a complete, readily visualized picture of all the combinations of two into which a larger given value may be subdivided.

Yet another object of this invention is to provide an educational device which has a separate board for each value capable of being subdivided.

A further object of this invention is to supply an educational device which does not depend upon written numbers in order to achieve its purpose.

These, together with other objects and advantages which will become subsequently apparent, reside in the details of construction and operation as more fully hereinafter described and claimed, reference being had to the accompanying drawings, forming a part hereof, wherein like numerals refer to like parts throughout, and in which:

FIGURE 1 is a perspective view of a board representing a given numerical value (6) and the manner in which the blocks and separators are inserted to emphasize the combinations into which said numerical values may be subdivided;

FIGURE 2 is an elevational cross-sectional view, taken along the line 2—2 of FIGURE 1 and showing in greater detail the recess and how the blocks and separator are supported therein; and FIGURE 3 is a view in perspective of a single combination of numerical blocks and a separator in order to more clearly present the details thereof.

The drawings show that the supporting structure for this invention is a rectangular board generally shown by number 10 made of food or plastic or other suitably inexpensive material. Board 10 does not assume any definite dimensions, since it is desired that it be light, easy to handle and durable and not bulky or awkward. Board 10 has upper edge 12, lower edge 14, side edges 16, and upper surface 18. Near the upper edge 12 is fixedly mounted a block standard 20 which extends between side edges 16. Said block 20 is generally rectangular the ends of which are spaced from each of said side edges 16 and which is spaced a short distance below top edge 12. Said block 20 may be fixed directly to surface 18 or a recess may be provided in base 10 into which said block is fixedly mounted.

Below block 20 and above bottom edge 14 are a series of rectangular recesses 22 positioned, like block 20, generally parallel to the top and bottom edges. Said recesses 22 are equispaced from each other and extend perhaps one half the distance through the thickness of base 10. The recesses 22 are shaped to receive block units generally designated by number 26. Block units 26 are generally square in cross section as can be seen in FIGURE 3. The blocks vary in length from the single unit which is essentially a cube to a ten unit block (not shown) which is quite long. The blocks are provided with indicia 28 on the top surface thereof in order to clearly show the number of units which a block represents. Obviously there is a direct relationship or correlation between length and number of indicia.

The indicia may take various forms, patterns or designs but for simplicity and inexpensiveness raised discs 28 have been found to be very effective. The discs 28 may be adhered directly to the top surface of the blocks or mounted in recesses sunk into said top surface.

The device is completed by the addition of a separator 30, which also is used to represent zero value to each of the recesses. Said separator 30 is merely a rectangular piece of light metal, wood, plastic or heavy paper which extends above the top of blocks 26 so as to be clearly and unmistakably visible.

It will be obvious, even though the drawings illustrate only a six unit board, that the same general construction will apply to all boards from two to ten units. This will be so in spite of some variations in size of boards and blocks.

This teaching aid allows the child to remove all blocks 26 and separators 30 of the assembly and to manipulate them at will in the recesses in order to gain a picture of the combinations into which the value which the board represents may be divided. It is possible with small value blocks from other boards to show the combinations of more than two values into which the representative value may be subdivided. It should be realized that the upper surface 18 instead of having recesses may be provided with strips of material adhered to the surface to provide spaces in which the blocks 26 and separators 30 would be inserted.

The foregoing is considered as illustrative only of the principle of this invention. Since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

An arithmetic manipulator for the education of young children to teach them all the combinations of two into which an integer value may be subdivided comprising, a board having a rectangular standard block fixedly mounted thereupon and identifying by its length an integer value from two through 10, said board being formed to include a series of rectangular recesses, each of said recesses being of the same length as said standard block, there being one more of said recesses than the value identified by the length of said standard block, said recesses having removably fitted therein blocks with indicia thereon representing an integer value proportional to the length of the block, said blocks having a relationship of integer value to length which is slightly less than the corresponding relationship for said standard block so that said blocks when combined to have the standard value almost completely fill said recesses, and divided blocks dimensioned to be inserted in said recesses and filling the same.

References Cited by the Examiner

UNITED STATES PATENTS

| | | | |
|---|---|---|---|
| 2,494,469 | 1/1950 | Booth | 35—31.4 |
| 2,530,447 | 11/1950 | Birdsall | 35—70 X |

FOREIGN PATENTS 648,568    1/1930    France.
(Addition to No. 36,115)

EUGENE R. CAPOZIO, *Primary Examiner.*

JEROME SCHNALL, *Examiner.*

WILLIAM GRIEB, *Assistant Examiner.*